United States Patent
Rutka

(10) Patent No.: US 8,195,322 B2
(45) Date of Patent: Jun. 5, 2012

(54) METHOD OF ANALYZING AN ASSEMBLY OF PARTS WITH RESPECT TO A PREDETERMINED DESIGN CRITERION

(75) Inventor: Andre Rutka, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 262 days.

(21) Appl. No.: 12/307,422

(22) PCT Filed: Jul. 5, 2007

(86) PCT No.: PCT/FR2007/001149
§ 371 (c)(1),
(2), (4) Date: Jan. 5, 2009

(87) PCT Pub. No.: WO2008/003867
PCT Pub. Date: Jan. 10, 2008

(65) Prior Publication Data
US 2009/0287336 A1 Nov. 19, 2009

(30) Foreign Application Priority Data

Jul. 5, 2006 (FR) ...................................... 06 06110

(51) Int. Cl.
*G06F 19/00* (2011.01)

(52) U.S. Cl. ........................................ 700/103; 700/97

(58) Field of Classification Search .................... 700/97, 700/98, 103
See application file for complete search history.

(56) References Cited

U.S. PATENT DOCUMENTS

| | | | |
|---|---|---|---|
| 4,868,770 A | 9/1989 | Smith et al. | 703/14 |
| 6,112,022 A | 8/2000 | Wei | 703/14 |
| 6,249,901 B1 | 6/2001 | Yuan et al. | 716/5 |
| 2004/0044504 A1* | 3/2004 | Shimizu | 703/2 |
| 2005/0066301 A1 | 3/2005 | Lorenz et al. | 716/20 |
| 2005/0080502 A1 | 4/2005 | Chernyak et al. | 700/97 |
| 2005/0144196 A1 | 6/2005 | Kok | 707/202 |
| 2006/0129259 A1* | 6/2006 | Tornquist et al. | 700/98 |

FOREIGN PATENT DOCUMENTS

| | | |
|---|---|---|
| FR | 2 860 317 | 4/2005 |
| JP | 06103331 | 4/1994 |
| JP | 09190446 | 7/1997 |

* cited by examiner

*Primary Examiner* — Ryan Jarrett
(74) *Attorney, Agent, or Firm* — Oblon, Spivak, McClelland, Maier & Neustadt, L.L.P.

(57) ABSTRACT

The invention relates to a method of analyzing an assembly of parts with respect to at least one predetermined design criterion, characterized in that it comprises the following steps performed on the basis of the design data represented by digital mock-ups each reliably representing a part in three dimensions, the assembly of mock-ups together defining the assembly of parts in three dimensions:—identifying the parts of the assembly,—determining, among the parts thus identified of the assembly, several first pairs of parts which each define two parts in mechanical contact with one another,—determining, among the first pairs of parts, several second pairs of parts which each define two parts which conform to said at least one predetermined criterion,—identifying a set of second pairs of parts,—as a function of the set thus identified, determining the result of the analysis of the assembly of parts with respect to said at least one predetermined design criterion.

13 Claims, 10 Drawing Sheets

METHOD OF ANALYZING AN ASSEMBLY OF PARTS WITH RESPECT TO A PREDETERMINED DESIGN CRITERION

The invention concerns a method of analyzing an assembly of parts with respect to at least one predetermined design criterion, or a portion of this assembly.

In various sectors of industry, such as aeronautics or automobiles, increasingly more complicated mechanical structures are being designed at present, very often integrating electrical and thermal aspects, for example, or those relating to sealing problems.

The structures thus designed need to meet a large number of requirements, both mechanical and electrical.

As an example, when designing a structure as complicated as an aircraft, which can include several hundreds, if not several thousands of parts which are assembled with each other, a very precise set of specifications for electrical performance and characteristics of the structure needs to be followed.

For example, one needs to make sure of the proper electrical behavior of an aeronautical structure with respect to lightning.

Today, measurements of electrical conductivity are made on the actual structure to test its electrical behavior.

Now, if the measurement results show that the electrical behavior of the structure is not satisfactory, one has to review the entire design of the structure to uncover the design error or errors.

For a structure made up of several hundreds or thousands of parts, one can easily understand that such a task will lead to a sizeable delay, possibly entailing a penalty in the delivery of the finished product.

What is more, this task will require the services of qualified personnel for an indeterminate period of time and result in not inconsiderable costs.

In view of the foregoing, it would thus be particularly useful to be able to determine the electrical behavior, from a quality standpoint, of a complex assembly of parts prior to its physical realization.

More generally, it would be useful to be able to analyze qualitatively, with respect to one or more predetermined design criteria, the physical behavior of an assembly of parts which may be complex (both in terms of the number of parts making it up and the number of different technical fields or subject areas involved in its design), with a view to its fabrication.

Thus, the purpose of the present invention is a method of analyzing an assembly of parts with respect to at least one predetermined design criterion, characterized in that it comprises the following steps carried out on the basis of design data represented by digital mockups, each one faithfully representing one part in three dimensions, and the assembling of the mockups with each other defining the assembly of parts in three dimensions:
  identification of the parts of the assembly,
  determination, among the parts of the assembly thus identified, of several first pairs of parts, each of them defining two parts in mechanical contact with one another,
  determination, among the first pairs of parts, of several second pairs of parts, each of them defining two parts which conform to said at least one predetermined criterion,
  identification of a set of second pairs of parts,
  determination, in dependence on the set thus identified, of the result of the analysis of the assembly of parts with respect to said at least one predetermined design criterion.

The invention makes it possible to analyze an assembly of parts or a portion of the latter with respect to one or more predetermined design criteria, before it has been fabricated.

The criterion or criteria are qualitative and the analysis of the assembly with respect to this or these criteria will make it possible to determine the physical (qualitative) behavior of this assembly in response to one or more qualitative design constraints (or rules).

The assembly being faithfully reproduced thanks to the digital mockups of the parts, its analysis provides a result which can be used directly for its design, unlike the case of models used for application of the finite element methods.

Based on the result of this analysis, the assembly can thus be validated with respect to the criterion or criteria considered, or be modified.

The analysis of the assembly may consist in determining or verifying its conformity with the predetermined design criterion or criteria and thus make it possible to ensure, prior to fabrication, that the assembly will indeed obey the design rules.

Examples of Design Criteria are Provided Below.

One can thus verify, for example, whether the assembly or a portion thereof is tight to one or more fluids (water, air, etc.) by locally verifying, at the level of the parts in contact of the assembly, those which have an ability to be sealed tight and thus possess what is known as a sealing attribute.

In practice, one verifies, for example, whether the parts have undergone a sealing treatment or whether a sealing joint has been applied to them.

This verification can be done, for example, on a portion of the assembly in order to validate the tightness function of one or more zones or to reveal such zones in the structure.

Furthermore, one can verify whether the different parts in contact of the assembly have undergone a surface treatment (for example, such as application of an insulating paint coating) so as to determine the impact which such a local treatment may have on the physical behavior of the assembly or a portion thereof.

The application of a surface treatment to several parts of the assembly may affect the physical behavior expected of the assembly or a portion thereof, taking into account the physical properties of the materials making up the parts.

As an example, the application of a coating of an electrically insulating paint on parts of the assembly may modify the behavior of this assembly or a portion thereof with respect to the propagation of an electrical flow. In such a case, the invention makes it possible to determine from a qualitative standpoint the physical behavior of the assembly or a portion thereof with respect to the propagation of the electrical flow and to verify whether this behavior conforms to the criterion of the flow propagation.

Moreover, it is possible to verify the physical behavior of an assembly with respect to assembly constraints (for example, the assembled parts needing to be placed at a minimum distance from an object, for example, for safety or other reasons) or with respect to a given assembly method (welding of assembled parts, etc.).

The invention also makes it possible to validate an architecture of a structure made from assembled parts and, for example, to identify possible problems of segregation in the structure. For example, during the analysis of an assembly of parts it may be necessary to analyze its behavior with respect to one or more criteria in the event of malfunctioning of a portion of the assembly. Thus, in an assembly which may constitute electrical circuits, some of which are in duplicate, one seeks to verify that in the event of a break in one of the duplicated circuits the other circuits will operate (transmission of an electrical flow in these other circuits, for example).

To analyze the assembly and, more particularly, to verify/determine the conformity of this assembly with respect to one or more of the aforesaid criteria or other criteria, the invention calls for determining, in the assembly, pairs of parts in individualized manner. More particularly, it is a matter of determining, within the structure, first pairs of parts, each one representing a mechanical contact between the two parts of the pair and, among these first pairs, second pairs of parts conforming to the chosen criterion or criteria.

It will be noted that the first pairs can identify all the mechanical contacts established between all the parts of the assembly or only certain of them, if one is only interested in a portion of the assembled structure.

For the same reason, the second pairs may include only certain of the second pairs which can be determined based on the first pairs.

Based on an identified set of second pairs of parts, which can include all the second pairs so determined, one analyzes how this set satisfies the predetermined criterion or criteria (physical behavior of the assembly). For example, starting with a part selected from the assembly and based on the aforesaid set, one can verify the possible conformity with the criterion or criteria of physical behavior of the assembly or a portion thereof.

The selection of a part makes it possible to commence an investigation with regard to a particular problem and facilitates the exploitation of the result by the end user. In this way, one will follow a path from a source, which can be a piece of equipment or an electrical harness, for example, in the case of an electrical analysis, or even a part of a tank, in the case of a tightness analysis.

By thus identifying in formal fashion pairs of parts among an assembly of parts, one obtains a kind of mapping of the assembly, represented by these pairs, which can be saved in memory.

This deconstruction of the assembly, or a portion thereof, into first and second pairs of parts has the advantage of modularity. Thus, if the assembly is subsequently modified, it is enough to identify the pairs of parts affected by the modification and to then modify them, for example, by creating new first and second pairs of parts in case of adding of new parts to the existing structure. It is also possible to delete pairs in the event of deletion of parts from the assembly.

Thus, it is not necessary to revise the entire design of the assembly and determine once again the set of first and second pairs in order to verify the conformity of the assembly so modified, which provides a considerable savings of time and reduces the volume of work to be done.

Furthermore, the analysis of the assembly with respect to at least one design criterion can also consist in analyzing the qualitative behavior of the assembly when a modification has been done for one or more parts of this assembly (adding and/or removal of parts, modification of a portion of part(s), changing the position of a part, or changing the material for a part, etc.).

In other words, it is a question of determining which of the parts of the assembly are affected by the modification(s).

According to another aspect, during the determination of second pairs of parts among the first pairs of parts in contact, one determines these second pairs with regard to a design criterion which can be the design status of the parts in the design and development process.

Thus, the development cycle of the parts of the assembly is taken into account during the analysis of modification(s) made to the assembly.

Consequently, when determining the second pairs, one takes account of the fact that some parts have already been fabricated or are in a stage of design or development too far along to be further modified. Thus, such parts cannot be affected by the modifications.

According to one characteristic, the assembly of parts contains several subassemblies or portions, each one including a plurality of parts, the subassemblies being designed separately from each other.

Thus, the invention makes it possible to determine by qualitative analysis the physical behavior with respect to one or more predetermined criteria (see the examples above) of an assembly that was initially designed by separate pieces in geographically distinct zones (design sites), and sometimes even in different design environments.

The invention thus offers a possibility of integrating, for the first time prior to fabrication, all the subassemblies in one and the same assembly and of determining the real behavior of the latter with respect to the predictable behavior in terms of a predetermined design criterion (tightness, fire resistance, shock resistance, electromagnetic shielding, etc.).

Thus, even if the subassemblies have already been designed, their design can be reviewed, after integration at the final assembly location, to take account of interactions with the other subassemblies and possible malfunctions detected by the analysis per the invention.

According to another characteristic, the assembly contains at least several hundreds of parts, or even several thousands.

The invention is particularly adapted for assemblies having a large number of parts.

It is also adapted in particular to assemblies having a large number of parts and different responsibilities (many different people involved, whether in terms of specialties/technical fields involved or in terms of teams) and thus having problems of integration.

The invention makes it possible to verify the proper integration of the different components and also to quickly identify deficiencies within the assembly.

According to yet another characteristic, the analyzing of the assembly of parts or a portion thereof with respect to at least one predetermined design criterion involves the determination of at least one path taken by a flow of a physical quantity in the assembly or a portion thereof, the steps of the method being more particularly the following ones:

identification of the parts of the assembly and determination of first and second pairs of parts, the step of determination of the second pairs of parts being done according to properties of the materials making up the parts of the first pairs of parts, the two parts of each second pair being able to propagate the flow from one part to the other, selection of at least one of the parts of the assembly, identification, among the parts of the second pairs of parts, of the parts which are able to propagate the flow coming directly or indirectly from said at least one part selected in the form of a set of second pairs of parts, determination, in dependence on the parts thus identified, of at least one path taken by the flow in the assembly or a portion thereof from said at least one selected part.

Thanks to the proposed invention, it is possible to identify the route taken by the flow in the assembly before the latter has even been fabricated, which makes it possible to predict in qualitative fashion the behavior of the assembly with respect to the propagation of the flow (without carrying out a quantified calculation of the flow), starting from design data of the assembly in three dimensions.

One can thus easily discover design errors in the assembly, such as identify isolated parts of this assembly that are not in mechanical contact with another part (absence of loops).

One can then contemplate visualizing these parts.

It is also possible to discover errors in the choice of the materials used for the realization of certain parts.

According to the prior art, one would have had to wait until the fabrication of the assembly and the results of measurements done on the latter in order to ascertain a defective condition, thus giving rise to delays and costs not compatible with the industrial production constraints.

Moreover, in the prior art the identification of the defective part or parts would have taken much more time than with the invention.

The invention makes it possible to determine qualitatively, and thus rapidly, one or more paths by which the flow propagates in the assembly.

Thus, if the qualitative model reveals design errors, it is not worthwhile to elaborate a more sophisticated model to quantitatively evaluate the propagation of the flow in the assembly.

In the event of design errors, it is nonetheless possible that the flow cannot be propagated through the entire assembly.

In general manner, after having determined a path for the flow, one can make a decision as to verifying the conformity of the assembly or a portion thereof with respect to a predetermined design criterion (ability to propagate a flow, for example, or electrical insulation of a portion of the assembly, etc.).

According to one characteristic, the method includes a step of determination of the contact rank among the identified parts of the second pairs of parts and said at least one selected part, a part in direct contact with said at least one selected part being a part of contact rank 1, an indirect contact being identified by a contact rank greater than 1.

The identification of the contact rank of the parts of second pairs makes it possible to reveal the effects of second or third order in the assembly. Coupled with the occurrence of appearance of the parts in a propagation tree diagram representing the assembly, the identification of the contact rank of the parts of second pairs proves to be a good indicator of the sensitivity of the part to the criterion, and thus make it possible to guide the designer toward a better product design.

According to one characteristic, the property of the materials which is considered is the ability of the materials to transmit the flow of the physical quantity.

The property of the materials is, for example, the electrical conductivity, the physical quantity is the electrical current, and the flow is electrical.

Thus, one will evaluate the electrical behavior of the assembly (for example, the lightning resistance of the structure), and determine in particular the way in which electrical current is propagated in this assembly.

Moreover, it is equally possible to evaluate the ability of the assembly to transmit heat (thermal flux), taking into account the thermal conductivity of the materials making up the parts.

According to one characteristic, the method involves a step of visualization of second pairs of parts of the assembly, which will serve in the determination of the path or paths.

According to one characteristic, the parts are visualized in a table of two dimensions, having as row and column headings the different parts of the assembly, and having boxes located at the intersection of the various rows and columns, each one containing information, for the corresponding pair of parts, on the ability or lack of ability to propagate the flow between the corresponding parts of the pair.

This ability or lack of ability to propagate the flow is characterized, for the electrical or thermal flow, by the presence or absence of an electrical or thermal contact between the parts.

According to one characteristic, the method involves a step of identification, among the first pairs of parts, of parts not conductive for the flow.

This makes it possible to verify whether a given set of specifications is obeyed in certain zones of the assembly.

According to one characteristic, the method includes a step of visualization of parts not conductive for the flow, which is one way of rapid verification of the existence and the location of such parts.

According to one characteristic, the method includes a step of identification and possibly visualization of parts which are not in mechanical contact with any other part, thus making it possible to detect errors of design.

According to one characteristic, the method includes a step of visualization of the parts of the second pairs of parts that are able to propagate the flow coming directly or indirectly from said at least one selected part.

It is thus possible to verify whether the flux is being propagated between two parts of the assembly.

According to another characteristic, the method includes a step of visualization of the contact rank between the identified parts of the second pairs of parts.

In the case of an analysis of propagation of modification, the visualization of the contact rank of the parts makes it possible to reveal the risks of indirect impacts and thus allows for a better anticipation.

According to one characteristic, the parts of the second pairs are visualized in a table of two dimensions, having as row and column headings the different parts of the assembly, and having boxes located at the intersection of the various rows and columns, each one containing information, for the corresponding pair of parts, on the ability or lack of ability to propagate the flow between the corresponding parts of the pair and, in case of an ability to do so, each particular box containing information as to the rank of contact between the corresponding parts.

The matrix-type or tabular visualization is used to evaluate the architecture of the assembly. The parts having major impact or being impacted are clearly identifiable.

More particularly, the parts are visualized in a table of two dimensions, having as row and column headings the different parts of the assembly, and having boxes located at the intersection of the various rows and columns, each one containing information, for the corresponding pair of parts, on the ability or lack of ability to propagate the flow from one part to the other of the pair and, in case of an ability to do so, each particular box containing information as to the rank of contact between the corresponding parts, the row or column heading of said at least one selected part being identified in the table, said heading making it possible to identify, by means of boxes containing information on the ability to directly propagate the flow from one part to the other, the headings of the columns or rows pertaining to the corresponding parts of the second pairs, of which said at least one selected part is a part and which are in direct contact with the latter, these parts being known as parts of contact rank 1, and in general manner the headings of the rows or columns which pertain to the parts of contact rank n making it possible to identify, by means of boxes containing information on the ability to propagate the flow indirectly by a contact rank n+1, the headings of the columns or rows pertaining to the corresponding parts of the second pairs called parts of contact rank n+1.

According to another embodiment, the parts are visualized in a propagation tree diagram having as its root said at least one selected part and as its branches the parts of the second pairs with which it is in direct or indirect contact, said parts of the second pairs being organized according to a hierarchical branching established as a function of different levels of propagation in the tree, each level corresponding to the contact rank between said at least one selected part and each of said parts of the second pairs.

The visualization in tree form is done after determining a path and it makes it possible to reveal the loops in the assembly, as well as the number of occurrences of the parts.

According to another embodiment, the parts are visualized in a three-dimensional representation of the structure, the different parts of the second pairs with which said at least one selected part is in direct or indirect contact being identified in different manner, depending on the contact rank.

According to one characteristic, the identification of the parts is done by assigning colors to said parts, thus facilitating the visual analysis of the behavior of the assembly with respect to the propagation of the flow.

According to one characteristic, the method involves a preliminary step of determination of the materials which are conductive for the flow and those which are not conductive for the flow based on the materials making up the different parts of the assembly.

According to one characteristic, the step of determination is carried out with respect to a previously set flow conductivity threshold, which comes down to setting a threshold of resistivity in the case of an electrical or thermal flow.

According to one characteristic, the method involves a preliminary step of determination of a list of pairs of materials which are incompatible with each other, which lets one avoid potential design errors.

According to one characteristic, the method involves a step of identification of materials incompatible with each other for the parts identified in the first pairs of parts of the assembly.

It is thus possible to reveal potential design errors.

According to one characteristic, the step of selection calls for the selection of two parts of the assembly in order to determine at least one path taken by the flow between these two parts. One thus chooses a point of entry and a point of exit for the flow in the assembly in order to determine whether the flow can be transmitted between these two parts and by which path or paths inside the structure.

According to one characteristic, the method involves a step of visualization of said at least one path taken by the flow, thus enabling a quick analysis of potential design errors.

According to one characteristic, the assembly of parts is an aircraft structure.

In such a structure, one finds assemblies containing a very large number of parts, which makes the application of the method according to the invention to such assemblies particularly interesting.

The invention also deals with a method of fabrication of an assembly of parts, characterized in that it contains the following steps:
analysis of the assembly with respect to at least one predetermined design criterion in keeping with the method briefly set forth above
and, if a decision is made validating the assembly with respect to said at least one criterion, fabrication of the assembly.

It will be noted that, more generally, after the step of analysis the method can contain a decision step, which depends on the result of the analysis step.

Thus, depending on the result, a decision is made as to the fabrication of the assembly or modification of the assembly of parts prior to the fabrication.

This invention also deals with a method of determination of at least one path taken by a flow of a physical quantity in an assembly of parts, characterized in that it involves the following steps carried out on the basis of digital data defining the assembly of parts in three dimensions:
identification of the parts of the assembly,
identification of the parts of the assembly which are in mechanical contact with each other in the form of first pairs of parts,
according to the properties of the materials making up the different parts of said first pairs of parts, identification, among said first pairs of parts, of the parts of the assembly which are able to propagate the flow from one part to the other in the form of second pairs of parts,
selection of at least one of the parts of the assembly,
identification, among the parts of said second pairs of parts, of the parts which are able to propagate the flow coming directly or indirectly from said at least one part selected,
determination, in dependence on the parts thus identified, of at least one path taken by the flow on the basis of said at least one part selected.

The invention also has as a purpose a method of fabrication of an assembly of parts, comprising a preliminary determination of at least one path taken by a flow in said assembly according to the method briefly set forth above.

The method briefly set forth above provides, starting with as faithful as possible a representation of the assembly, a qualitative analysis of the behavior of this assembly with respect to a design criterion. This analysis is done for the purpose of the fabrication of the assembly and thus differs greatly from a model that would be established on the basis of finite elements.

There is obvious interest in using a method determining at least one path taken by a flow in such a structure of parts in a fabrication process for the latter, since one thus achieves a savings in time and an economic gain in the overall fabrication process.

The invention also has as a purpose a computer program which can be loaded on a data processing system and which includes sequences of instructions to implement the steps of the method briefly set forth above when this program is loaded onto the data processing system and executed in it.

Other characteristics and advantages will appear in the course of the following description, given solely as a nonlimiting example and making reference to the appended drawings, where:

Figure 1:
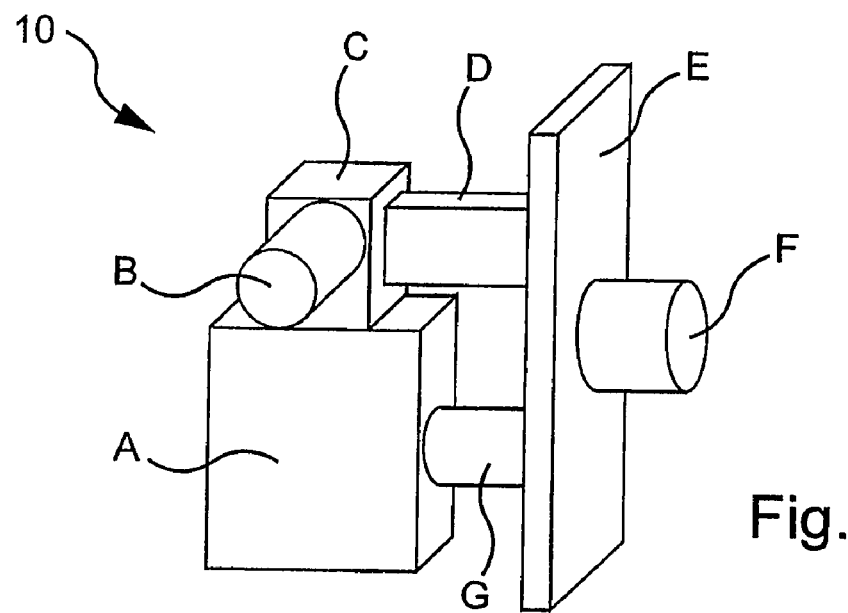
FIG. 1 is a schematic perspective representation of an aircraft structure.

According to one sample embodiment shown in FIG. 1, an aircraft structure 10 comprises an assembly of various parts A, B, C, D, E, F and G making up this structure.

One such structure is, for example, a jet engine pylon ("pylon" in English terminology).

This sample embodiment makes use of a small number of mechanical parts to facilitate the understanding of the invention, whereas of course the invention can apply to complex structures containing hundreds, or even thousands of parts which can be designed as subassemblies of separate parts in locations remote from each other.

Aeronautical structures must comply with a certain number of design requirements or rules (criteria) formulated in specifications, and among these requirements one can mention lightning resistance of the structure.

In order to verify the conformity of a structure with respect to this criterion, it is known to proceed in conventional manner with electrical conductivity calculations making use of complex digital models. These models prove to be little suited to the complexity of aeronautical structures and to the large number of parts of which they are made up.

Thus, to make sure of the lightning resistance of the structure 10 of FIG. 1, one verifies its electrical conductivity by tests performed on the fabricated structure.

For example, one proceeds with a realworld test consisting in measuring the electrical resistivity between part A and part F of the actual structure.

However, if the measured value is not satisfactory, the structure already built is found to be defective, the design of the structure then has to be revised and a new structure is then fabricated and tested once again.

The description of the following sample embodiment makes it possible to verify the electrical conductivity of the structure before its fabrication, and thus to be able to modify the structure at less expense in the event of a lack of electrical conductivity, for example, between parts A and F.

Thus, for example, one can either modify in mechanical fashion the arrangement of the different parts among each other, or replace a material making up one of these parts by a more suited material.

To verify the electrical behavior of the structure, one first proceeds with the identification of the parts of the assembly and the determination of the parts which are in mechanical contact with each other.

Figure 2:
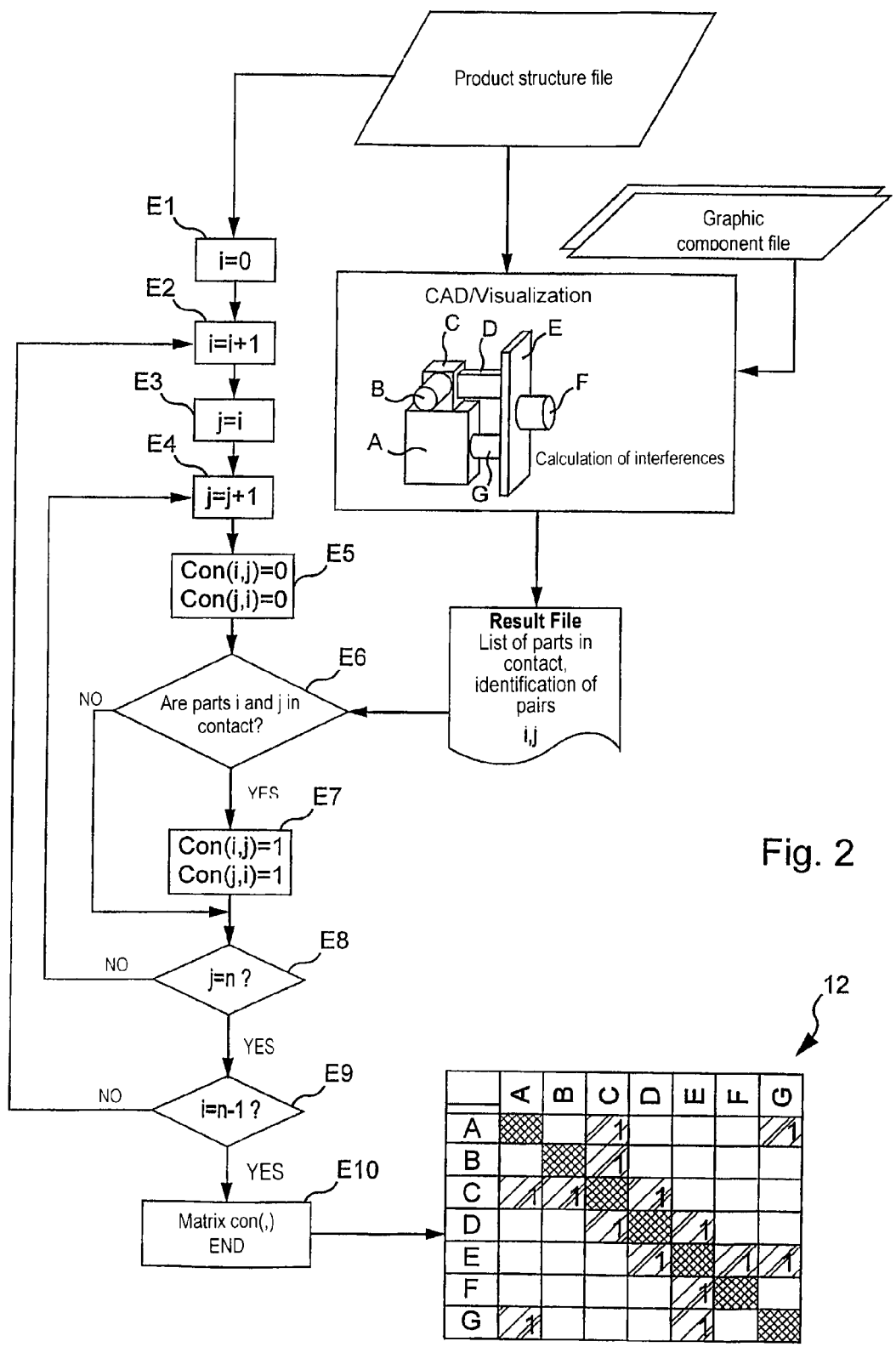
FIG. 2 is an algorithm for production of a connectivity matrix.

FIG. 2 shows an algorithm for determination of the parts of the assembly that are in mechanical contact with each other.

According to this algorithm, one runs through and processes the different parts of the assembly in the different steps E1 to E10 and, in particular, in step E6, one determines whether the parts of each pair of parts (i, j) are in contact or not.

For the execution of this step, it is necessary to develop a list of parts in contact from digital data design files (digital mockups), defining the assembly of the parts in three dimensions.

Each digital design mockup faithfully reproduces one part of the assembly for purposes of its later fabrication.

The implementing of this algorithm makes it possible to obtain a means of visualization of the parts in contact, for example, in the form of a matrix 12, known as a connectivity matrix.

This matrix, which can also be considered a table of two dimensions, contains rows and columns whose headings are identical and correspond to the different parts of the assembly.

Thus, one finds the different parts A, B, C, D, E, F and G as the headings of the rows and columns of the matrix 12.

In the algorithm which is now going to be described, one uses the variables i and j to identify the coordinates (i, j) of the different pairs of parts of the matrix.

The algorithm involves a first step E1 of zero initialization of the variable and a step E2 for incrementing this variable by one unit.

The next step E3 sets the value of the variable j at that of the variable i and the following step E4 calls for incrementing the value of the variable j by one unit.

The next step E5 sets at zero the values of the elements of the matrix corresponding to the values of the variables i and j previously determined, or, for i=j=1 (Con(i,j)=0 and Con(j,i)=0).

Thus, the values of the elements of the matrix situated at the intersection of the different rows and columns and which each contain information, for the corresponding pair of parts, as to the presence or lack of a mechanical contact between the corresponding parts of the pair, are by default set at zero.

In the course of the next step E6, a test is performed to determine whether the parts corresponding to the variables i and j, whose values have been previously determined, are in mechanical contact with each other.

To obtain this information, one consults, for example, graphic files containing digital data defining the parts of the assembly in three dimensions (these files make it possible to model the different parts of the assembly), for example, of the native CAD file type, or faceted files, such as VRML, 3D/XML, etc.

To describe the structure of the assembly, especially the geometrical positioning of the different parts in space, one uses an assembly file of product structure type or several files of this type.

Such a product structure file contains digital data defining the assembly of parts in three dimensions (geometry, etc.). Such a file can also contain, for example, information as to the materials of the parts.

These two different types of files (graphics files and product structure files) are then used in a visualization tool of the type, for example, DVISE or Product View, marketed by the company Parametric Technology for faceted files, and they are used in a CAD type environment for the native files.

Thus, starting with files describing the different parts making up the assembly (native CAD files or faceted files) and files describing the structure of the assembly, the visualization tool makes it possible to visualize the assembly 10 shown in FIG. 1.

The visualization can be done on a monitor and the user selects on the screen the assembly or a portion of the assembly, in the case of an assembly made up of several thousands of parts (he can thus work on subassemblies of this assembly) and starts the execution of a calculation engine for interferences on the assembly so selected.

An interference calculation engine is furnished, for example, with the above-mentioned Product View visualization tool.

The calculation of interferences performed on the different parts of the selected assembly makes it possible to identify all the parts of the assembly that are in mechanical contact with each other.

It will be noted that, to define the parts in contact with each other by a calculation of interferences, one must first specify for the engine a minimum permitted mechanical play between two parts, that is, define the distance separating these two parts in the form of a minimum threshold.

Below this threshold, the two parts are no longer considered as being in contact with one another, but rather as being "interpenetrating", which corresponds to a design error.

At the end of the calculations performed by the interference calculation engine, one obtains results in a file in the form of a list of pairs of parts in contact.

It will be noted that, during this step, one can also locate the parts which are in a given geometrical volume or envelope or, more generally, those which need to obey certain design constraints.

Based on these results, one either considers in step E6 that the parts i and j are in contact or in relation (indirect contact, for example, across a geometrical envelope) with one another and thus ends up at the next step E7, or the parts are not in contact and one bypasses this step E7.

During step E7, one sets at 1 the values corresponding to the elements of the matrix corresponding to the pairs of parts (i, j) for which a mechanical contact is identified.

Of course, if the part i is in contact with the part j, then the part j is likewise in contact with the part i, which ensures the symmetry of the connectivity matrix or the corresponding table with respect to the diagonal.

In the course of the next step E8, a test is performed on the value of the variable j to find out whether all the parts j have already been run through for the aforesaid value of the variable i.

If not, then one goes to step E4, already described above, to increment the value of the variable j by one unit.

Otherwise, one goes on to the next step E9 to identify whether the value of the variable i has reached the value n−1, where n denotes the last part of the assembly, and if not, one goes to step E2, already described above, to increment the variable i by one unit.

In the contrary case, step E9 is followed by step E10, putting an end to the algorithm of FIG. 2.

It will be noted that as values Con (i, j) are assigned to the pairs (i, j) of different elements of the matrix, the corresponding value is entered in the matrix for the particular element situated at the intersection of the corresponding row i and column j.

Thus, as shown in FIG. 2, the results of the identification of the parts of the assembly which are in mechanical contact with each other are shown and visualized by the matrix or the table 12.

This matrix makes it possible to visualize for each pair of parts of the assembly the information as to the presence (1) or absence of a mechanical contact between the corresponding parts of the particular pair.

One can also take into account the nature of the relationship between the parts (direct contact, indirect contact by means of an envelope, etc.).

And so the matrix 12 representative of the assembly makes it possible to detect a mechanical contact between the following pairs of parts, termed the first pairs of parts:

(A,C); (C,B); (C,D); (A,G); (D,E); (G,E); (E,F).

This is one example of a way of representing mechanical contacts within the particular assembly, possibly taking into account geometrical constraints such as a geometrical volume or a spatial interaction with a given environment.

Figure 3:
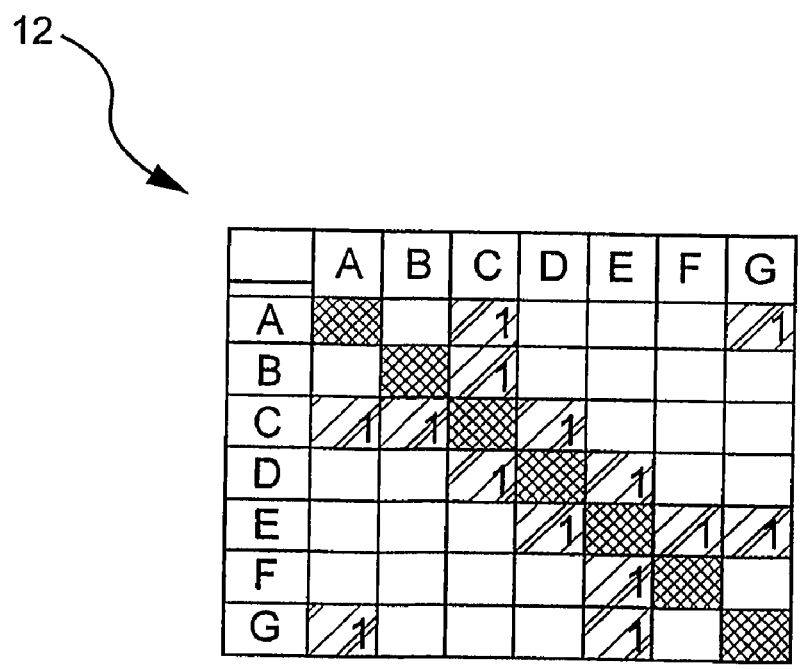
FIG. 3 is a magnified view of the connectivity matrix obtained with the algorithm of FIG. 2.

FIG. 3 illustrates the connectivity matrix 12 of FIG. 2, making it possible to visualize the first pairs of parts of the assembly.

This matrix is stored in memory to be used later on, particularly in connection with FIG. 4.

Figure 4:
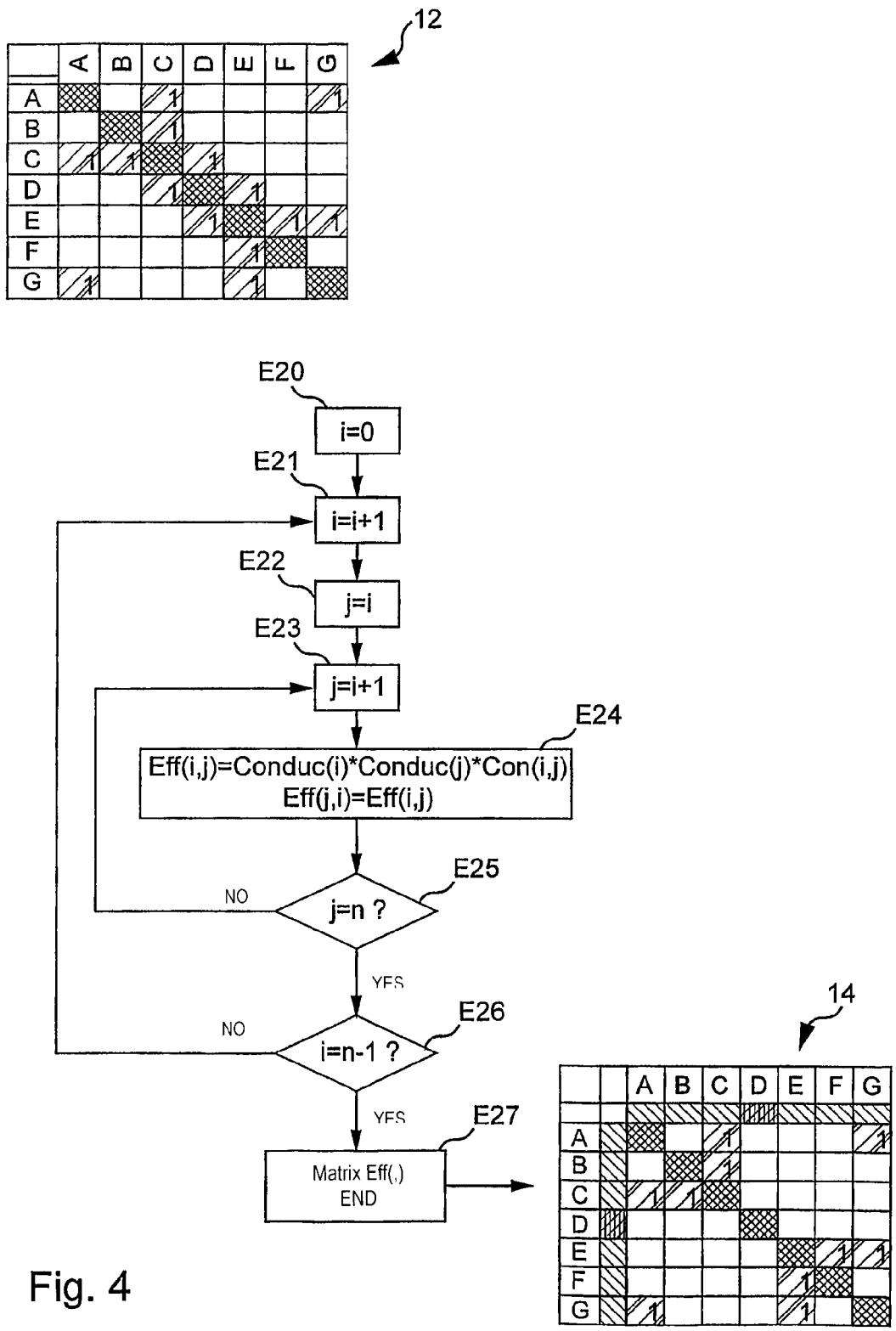
FIG. 4 is an algorithm for production of an efficacy matrix.

We will now construct, thanks to the algorithm of FIG. 4 and using the matrix 12 of FIG. 2, a matrix or table of two dimensions making it possible to identify, in the form of second pairs of parts, the parts of the assembly that are in electrical contact with each other. This new matrix will be called an efficacy matrix.

The different steps E20 to E27 make it possible to run through and process all the parts of the assembly and in particular to determine, in step E24, whether or not there is an electrical contact (ability to propagate the electrical flow or not) for the particular pair (i, j).

It will be noted that the execution of step E24 of this algorithm requires the execution of the algorithm of FIG. 5, which will be described later on.

This algorithm in fact takes into account the properties of the materials making up the different parts of the assembly in order to determine whether or not they will conduct the flow.

One thus starts from the connectivity matrix 12 of FIGS. 2 and 3 and sets the variables i and j in the steps E20, E21, E22 and E23 of the algorithm, making it possible to run through the different elements of this matrix.

The aforesaid steps are identical, respectively, to steps E1, E2, E3 and E4 of FIG. 2.

In the course of the following step E24, one determines the efficacy of the relationship between two parts based on, first, the electrical conductivity of the materials making up each part of the particular pair (Conduc (i) and Conduc (j)) and, secondly, the value Con (i, j), representative of the mechanical contact for the pair of corresponding parts in the matrix 12.

When this latter value is not zero (mechanical contact only for the first pairs of parts of the assembly), it is a question of identifying among these first pairs the parts of the assembly that are in electrical contact with each other.

Of course, the efficacy matrix is symmetrical, which means that Eff (j, i)=Eff (i, j).

The information as to the electrical conductivity of the materials making up the parts of the assembly and, in particular, the parts of the first pairs of parts, is obtained by the algorithm of FIG. 5, which will be described hereafter.

Generally speaking, one determines in the course of this step the parts of the assembly that satisfy the predetermined design criterion in order to form second pairs of parts.

Thus, one can determine the parts having received a particular treatment (sealing, painting, etc.) or the parts which have been modified based on a modified part of the assembly (analysis of the propagation of the modification).

In step E24, one can thus choose to take into account all the parts of the first pairs or only take into account the parts which are susceptible to being modified (because, for example, the state of advancement of the design of certain parts no longer lets them be impacted by the modification).

In the course of the following step E25, a test is performed on the value of the variable j to determine whether all the aforesaid parts of the row i have been run through.

If not, the already described step E23 is again executed to increment the value of the variable j by one unit.

If the entire row i of the matrix has been run through, step E25 is followed by another testing step E26 to determine whether the variable i has reached the value n−1, where n designates the last part of the assembly.

If not, step E21 already described above is again executed to increment the value of the variable i by one unit.

Otherwise, the algorithm is ended with step E27.

Thus, as the steps of the algorithm are executed, the different boxes of the table of the matrix 14 situated at the intersection of the different rows and columns are filled in with the values adapted to the corresponding pairs of parts.

These values include information as to the presence or absence of an electrical contact between the corresponding parts of the particular pair.

The information representative of the presence of an electrical contact between two parts of a pair of parts corresponds to the value 1.

In the event of absence of electrical contact between two parts, the corresponding box is set at zero, or unfilled.

Thus, the table or matrix 14 which is saved in memory makes it possible to visualize the second pairs of parts of the assembly for which the corresponding parts of the pair are in electrical contact with each other.

One Thus Identifies the Following Second Pairs:

(A,C); (A,G); (B,C); (E,F); (E,G).

Furthermore, the parts of the assembly that are not conductive are referenced, for example, by a color or a different marking.

In the present case, in the structure illustrated in FIG. 1, the part D is nonconductive and this property is represented, for example, by hatch marks in table 14.

Generally speaking, the efficacy matrix 14 so produced takes into account the behavior between two parts initially identified as being in contact, as a function of a predetermined design criterion associated with each of the parts.

If need be, the parts are subdivided into subparts or components so as to allow for an analysis of the assembly with respect to criteria which might be associated with these components and not the entire part (sealing or painting treatment on one surface of the part, for example).

It will be noted that the efficacy matrix is a function of the analysis criterion of the structure.

Figure 5:
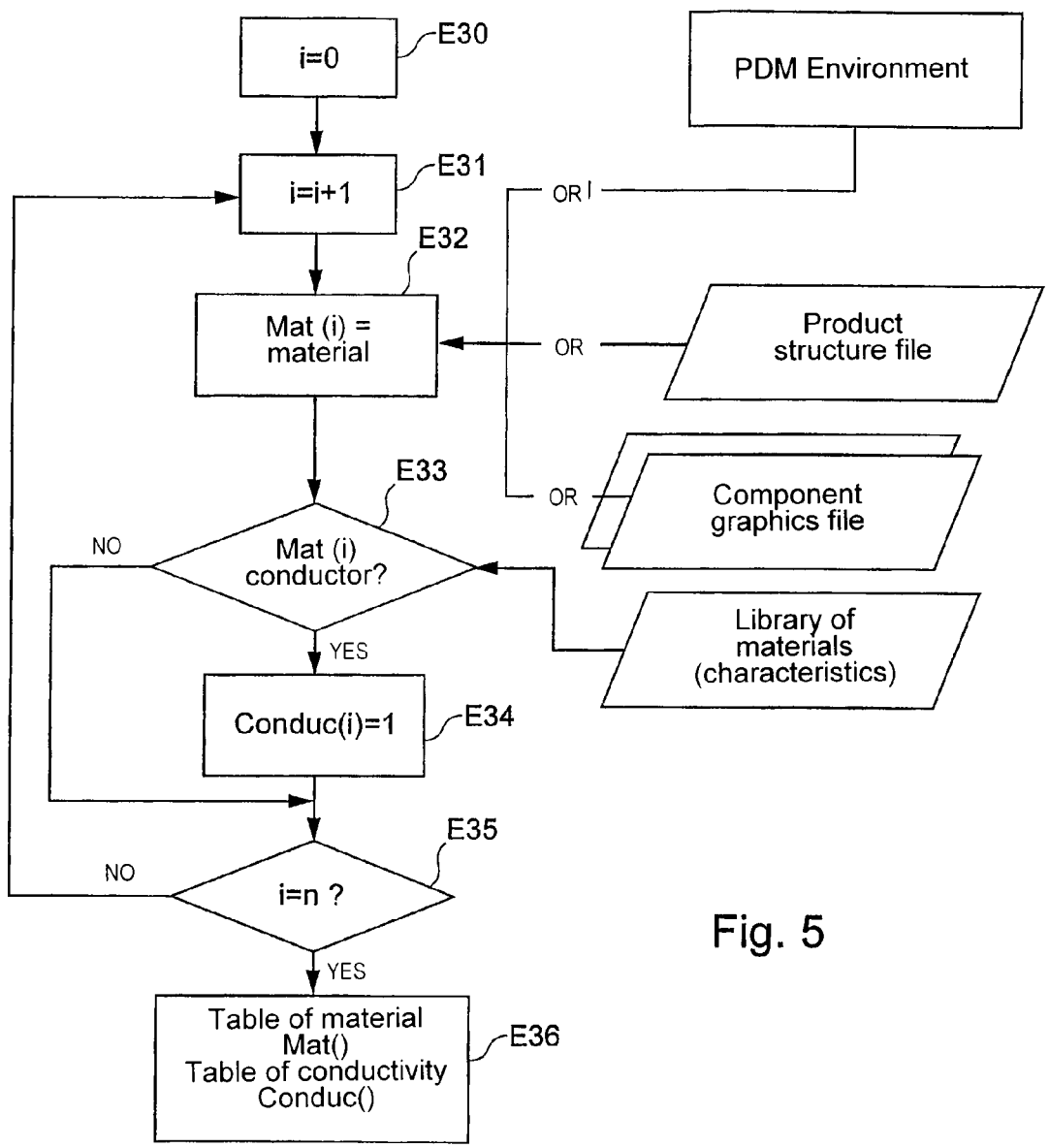
FIG. 5 is an algorithm for drawing up a list of the materials used for the realization of the parts of the assembly.

We shall now describe, with reference to FIG. 5, an algorithm making it possible to determine, for each of the parts of the assembly, the material of which they are made and the electrical conductivity of the part.

The algorithm of FIG. 5 starts with a step E30 of initialization of the variable i representing the different parts A to G of the assembly.

The next step E31 calls for incrementing by one unit the value of this variable and the next step E32 assigns a material to the particular part i, from one of the files mentioned in connection with the algorithm of FIG. 2, namely, product structure files, graphics files, or else from a "PDM Environment". By "PDM Environment" is meant the environment connected with the product data management (PDM being the acronym for "Product Data Management" in English terminology), resulting for example in the product structure file or files.

In the course of the next step E33, a test is performed in order to determine the electrically conductive nature of the particular part i as a function of its material.

This step is done, for example, from a library of materials used and their characteristics, especially their physical ones (conductivity, resistivity, thermal conductivity, etc.).

In practice, this step of determination of the materials which are electrical conductors or nonconductors is done with regard to a previously set threshold of electrical conductivity, below which it is deemed that the material is not a conductor.

When the material of the part i is considered to be an electrical conductor, then step E33 is followed by step E34, during which the value of its conductivity (Conduc (i)) is set at 1.

On the other hand, if the material of the part i is not a conductor, then step E33 is followed directly by step E35, during which a test is performed on the variable i to determine whether all the parts of the assembly have been run through.

If not, step E31 for incrementing the variable i, already described, is done again.

On the contrary, if all the parts of the assembly have been examined, then step E35 is followed by step E36, during which the table formed thanks to the running of the algorithm is validated.

This table, illustrated below, makes it possible to identify for each of the parts of the assembly the material used for the fabrication of this part and its nature as an electrical conductor or not.

| PART | MATERIAL | CONDUCTIVITY |
| --- | --- | --- |
| A | titanium | 1 |
| B | steel | 1 |
| C | titanium | 1 |
| D | plastic | 0 |
| E | aluminum | 1 |
| F | aluminum | 1 |
| G | titanium | 1 |

This information is then used in step E24 of FIG. 4 to fill out the efficacy matrix 14.

Figure 6:
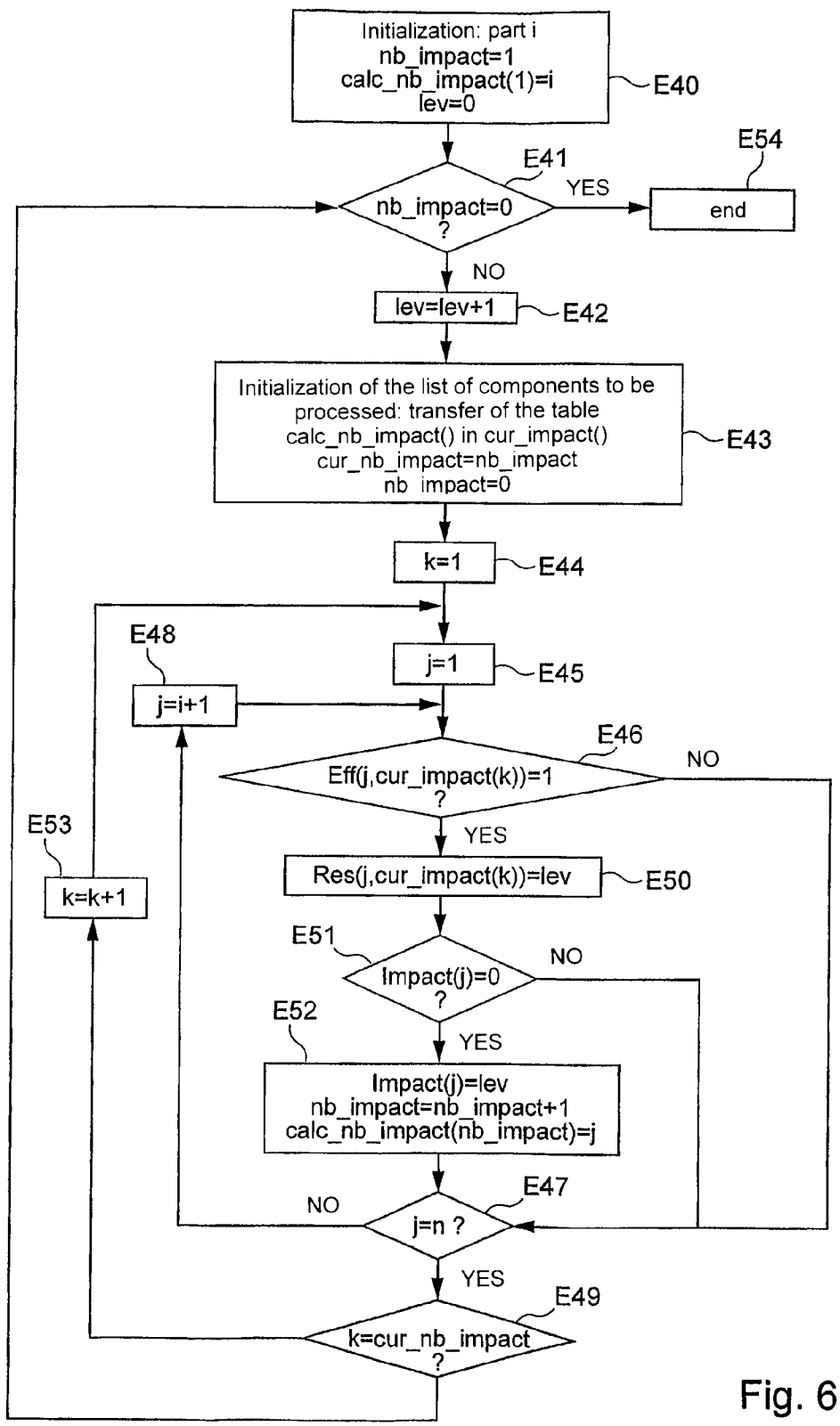
FIG. 6 is an algorithm for determination of the propagation of the electrical flow in the structure of FIG. 1.

Based on the efficacy matrix of FIG. 4, one uses the algorithm illustrated in FIG. 6 to determine the propagation of the electrical flow in the structure shown in FIG. 1.

In other words, it will be possible to determine the path or paths taken by the electrical flow in this structure based on the identification of the second pairs of parts that are shown in matrix 14 of FIG. 4.

Generally speaking, one selects in step E40 a part of the assembly, one identifies the second pairs of parts in step E43, one tests in step E46 whether the parts considered in the loop are in electrical contact and, if so, one identifies the corresponding level or rank of contact in step E50.

The algorithm of FIG. 6 starts with a step E40 of initialization of the different variables that will be used in this algorithm, namely, i denotes a part of the assembly, nb_impact is a counter of the number of parts affected (or impacted) by the electrical flow at the level lev, cur_impact is a list of the parts newly (for the first time) affected by the flow at the level lev−1, cur_nb_impact contains the number of parts affected by the flow at level lev−1, lev is the level of propagation of the flow in the structure or contact rank between the parts, calc_nb_impact( ) is a list of the parts newly affected by the flow at the level lev, Res(i, j) denotes, for the pair (i, j) of parts in electrical contact, the depth or the level at which this contact is established, impacts) indicates the depth to which a part is newly affected by the flow.

In particular, during this step, one selects, among the parts of the mechanical assembly, at least one of the parts (part i) from which one will determine the way in which the electrical flow is propagated in the parts of the second pairs.

One then initializes the following variables:

nb_impact=1 calc_nb_impact(1)=i lev=0

During the following step E41, a test is done for the value of the variable nb_impact.

When this value is not zero, then one moves on to the next step E42, which increments by one unit the variable lev. This variable defines the rank of the contact or level of current propagation between the selected part as point of entry of the electrical flow and the other parts of the second pairs that are in contact with it.

In particular, for this first loop, lev=1 and for this value one sought in the following steps the other parts of the second pairs that are in direct contact with the selected part.

During the next step E43, one identifies all the parts of the second pairs of parts.

Moreover, during this step, one establishes the following relations:

cur_impact( )=calc_nb_impact( )

cur_nb_impact=nb_impact nb_impact=0.

This makes it possible to list all the parts in the variable cur_impact and to determine the parts which they impact at the propagation level lev.

At the starting of the algorithm:

cur_impact(1)=i cur_nb_impact=1, because there is only a single part.

During the next step E44, the variable k, which is a counter of the parts impacted at the level lev−1, is set at 1. The different values taken on by k will make it possible to list all the parts in the variable cur_impact.

The next step E45 sets the value of the variable j at 1. This variable, in the course of the loop which is going to be described, will take on all the values from 1 to n, making it possible to run through all the other parts of the assembly for a given value of cur_impact (k) (selected part).

A test is provided in step E46 to determine whether the parts j and cur_impact(k) are in electrical contact with each other.

If not, this step is followed by step E47, which performs a test on the value of j. If j has not reached the value n, one moves on to step E48, which increments by one unit the variable j, and step E46 is again executed in order to determine whether the new part j is in contact with the part cur_impact(k).

If the result of the test of step E47 is positive, one moves on to step E49, which will be described later on.

After returning to step E46, when the result of the test performed is positive, that is, an electrical contact exists between the parts in question, one then moves on to step E50.

During this step, one enters for the particular pair of parts the rank of contact (depth or level of propagation) between these parts.

As an example, starting with part C as the selected part, the rank of contact between part C and part A is 1 and one thus writes per step E50 Res(1,3)=1.

The next step E51 consists in a test as to the value of the variable impact(j).

If the value of this variable is equal to zero, that means that the particular part has not yet been processed by the algorithm (in other words, that means that this part has not yet been impacted by the electrical flow) and one then moves on to the next step E52.

If, on the other hand, the part j has been processed, one goes directly to the test step E47, then to the step E48 of incrementing the variable j in the event of a negative test. Step E48, already described, is then executed once again. Thus, the part j will not be taken into account for the processing of the level lev+1.

Step E52 involves impacting the part j at the level of current propagation lev, which is equal here to 1 for the first loop of the algorithm.

One then increments the variable nb_impact by one unit, in order to allow for the number of parts newly impacted by the flow for the level of current propagation.

One then identifies the rank of the part newly impacted by the flow for the level of current propagation (calc_nb_impact (nb_impact)=j).

One thus draws up a temporary list of the parts impacted by the flow.

During the next step E47, a test is performed on the value of the variable j with respect to the value n in order to determine whether, for a selected part i, all the parts j have been processed, that is, starting from the part i, the flow is propagated to reach each of the other parts of the assembly.

If not all the parts have been processed, then step E47 is followed by step E48, already described above, otherwise step E47 is followed by step E49.

During this last step, one performs a test on the value of the variable k with respect to the value of cur_nb_impact in order to determine whether all of the parts impacted at the level lev−1 have been processed.

If the value k has not reached this last value, then the next step E53 calls for incrementing by one unit the value of the variable k. One then goes to step E45, already described above, to run through all the parts j of the assembly for this new value of k.

If an equality is found during step E49, it is followed by the testing step E41, already described above.

When the value of nb_impact is equal to zero, that means that there was no part newly impacted at the level lev, then step E41 is followed by step E54, which concludes the algorithm.

Otherwise, the algorithm is again executed, incrementing the level of current propagation lev by one unit in step E42.

By executing this algorithm, one thus identifies, from one selected part of the assembly, the other parts in direct or indirect electrical contact with it (for example, in the form of a list of parts in electrical contact), which makes it possible to establish the path or paths taken by the electrical flow in the structure starting from the selected part.

According to one version not represented, it is contemplated in step E51 to process the occurrences of appearance of parts affected by the flow. Thus, one determines the number of times that a part encounters the flow, which makes it possible to verify, for example, the zones of the assembly where the flow passes the most frequently (identification of nodes of the assembly).

More generally, one can determine the number of times that the same part of the assembly appears in the analysis done with respect to the design criterion (this can be used when one is interested in the architecture of an assembly of parts).

To take the foregoing into account, one introduces into the algorithm of FIG. 6 a new variable occ (j), which is incremented by one unit when the result of step E51 is negative (occ (j)=occ (j+1) and, in step E52, there will be indicated occ (j)=1.

After determining the occurrences, one can determine for each part, depending on its rank of contact (rank 1 for a direct contact and higher ranks for an indirect contact), the parts which represent an elevated design risk (for example, the parts having a contact rank 1 and a high number of appearances).

For this, one can draw up a table, each row (from top to bottom) having the contact rank from 1 to n, then the columns having the number of occurrences or the equivalent, and the particular parts at the intersection of a row and a column.

It will be noted that the determination of a path leads to a list of parts in electrical contact with each other with the corresponding rank or level of contact.

Figure 7:
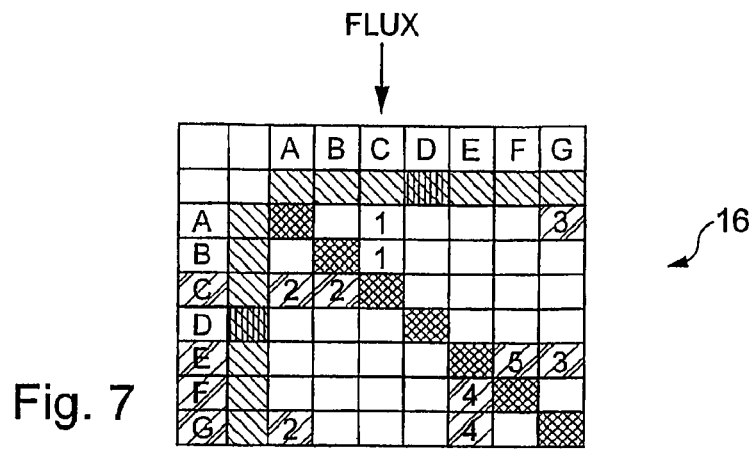
FIG. 7 is a schematic view of a first means of visualization of the propagation of the flow in the structure of FIG. 1.

FIG. 7 illustrates a conductivity matrix or table 16, translating the electrical behavior of the structure of FIG. 1 when subjected to an electrical flow.

This electrical behavior is determined from the effective matrix 14 illustrated in FIG. 4 by executing the algorithm of FIG. 6.

To end up with the matrix 16 of FIG. 7, one selects among the parts identified in matrix 14 one part, for example part C, from which the electrical flow will be introduced into the structure 10 of FIG. 1, as indicated by the top arrow in FIG. 7.

Starting from this part C (matrix column with the heading C), one runs through the other parts of the second pair of the assembly, namely, parts A and B, while part D is nonconductive and thus not included in the second pairs of the assembly.

One thus identifies the parts A and B as being parts of contact rank 1, since they are in direct contact with the selected part C, from which the flow starts.

One thus establishes that part C directly conducts the electrical flow to the parts A and B.

Next, starting with part A (matrix column corresponding to A) and running through the other parts of the second pairs of parts of the assembly, one finds the parts C and G in contact with part A, or for a contact rank 2.

Likewise, part B (matrix column corresponding to B) is in contact with part C.

It will be noted that this involves a contact rank of order 2, since these impacted parts are not directly impacted by the flow coming from the selected part, but by way of parts A and B.

One thus establishes that part A conducts the flow as far as parts C and G and that part B conducts the flow as far as part C.

Starting from the column corresponding to part G, one notices that this is in contact with part A and with part E and that this involves a contact rank of order 3.

Thus, one establishes that part G conducts the flow as far as parts A and E.

In turn, part E (column corresponding to part E) is direct contact with parts F and G for a contact rank of order 4.

Part E thus conducts the flow as far as parts F and G.

In turn, part F (column corresponding to part E) is in direct contact with part E for a contact rank of order 5 as compared to part C and thus conducts the flow as far as part E.

It should be noted that the algorithm of FIG. 6 only takes into account, for each level, the parts impacted for the first time by the flow, unlike the analysis just done where, for example, part C is impacted on several levels of propagation.

Matrix 16 of FIG. 7 thus makes it possible to visualize the parts of the second pairs that are in direct or indirect electrical contact with part C, the indirect contact being identified by a contact rank higher than 1.

This matrix also makes it possible to easily and quickly visualize the parts which are "up in the air", that is, those which are not in contact with any other part.

By visualizing these parts in contact with each other and making use of the information about the rank of contact between these parts, one is able to establish one or more paths taken by the electrical flow propagating from one part of the structure, such as part C.

It will be noted that the various boxes of the table (matrix) and the corresponding pairs of parts are assigned color codes corresponding to the ranks or levels of contact (levels of propagation) between the parts of said pairs.

Thus, the headings of the rows corresponding to the parts A and B, the heading of the column corresponding to part C, and the boxes bearing the number 1 (level 1) at the corresponding intersections are red, for example.

Likewise, for the contacts at levels 2, 3, 4 and 5, one assigns, respectively, the colors orange, yellow, green and blue, for example.

It will be noted that other means of visualization of the parts in direct or indirect electrical contact with each other and thus of the path taken by the flow in the structure can be contemplated.

Figure 8:
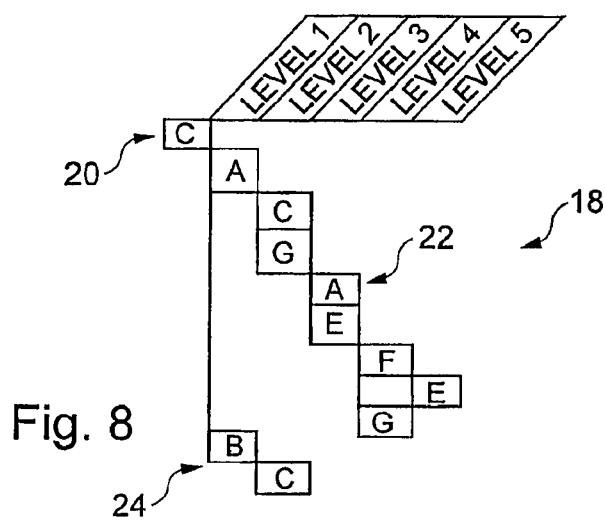
FIG. 8 is a schematic view of a second means of visualization of the propagation of the flow in the structure of FIG. 1.

Thus, the tree 18 of propagation of the electrical flow in the structure and which is shown in FIG. 8 constitutes one of the means implemented after executing the algorithm of FIG. 6.

It makes possible a rapid analysis of how the flow is propagated in the structure, clearly revealing the different hierarchical levels.

This tree of propagation has as its root 20 the selected part, namely, in the aforesaid example, part C, and the branches 22 and 24 of this tree are formed by the succession of the parts of the second pairs with which the selected part is in direct or indirect contact.

The parts of the second pairs in contact with the selected part are organized according to a hierarchical branching which is established as a function of the different levels of propagation of the flow in the tree.

In other words, each level (level_1, level_2, level_3, level_4, level_5) corresponds to the rank of contact between the selected part and the particular parts of the second pairs.

Thus, this means of representation reveals more directly than that of FIG. 7 the path taken by the electrical flow in the structure of FIG. 1 starting from the part C.

Thanks to this representation, one quickly and efficiently finds that the flow is propagated from part C to part F, passing through the intermediate parts A, G and E.

This representation makes it possible to avoid redundancies in regard to the parts which have already been impacted at a lower level (near the root of the tree).

It will be noted that color codes can be assigned to the different ranks or levels of contact (level_1, level_2, level_3, level_4, level_5), to the parts which are encountered by the flow for the first time (newly impacted), and to certain parts of the assembly that are impacted by the flow several times, at different levels.

The parts of the tree appear in frames whose edge color is that of the corresponding hierarchical level of contact.

Thus, as an example, part A is impacted for the first time by the flow at level 1 and it is assigned a given color, then at level 3 it is impacted once again. One can then assign to the background of the frame of part A, when it is impacted a second time at level 3, the color code referring to the first impact level (level 1).

Likewise, the part G, which is impacted for the first time at level 2, will be assigned a given color. When the part G receives the flow a second time at level 4, the background color of the frame of part G at level 4 refers to the color code that was assigned to part G at level 2.

The same holds for the part E, impacted at level 3 and at level 5.

Moreover, a different color code can be assigned to the part C, from which the flow starts and which can likewise find itself impacted indirectly on higher levels, that is, levels closer to the tips of the branches (level 2).

It will be noted that this marking of the parts in the tree makes it possible to identify loops in the structure, that is, closed circuits for the flow.

The same color codes as those assigned to the matrix of FIG. 7 are used, for example, in the tree of FIG. 8.

Generally speaking, the means illustrated in FIG. 8 makes it possible to identify the loops in the structure (flow, tightness, etc.) or the absence of a loop (which requires a local modification of the structure) and the occurrences (for example, the number of times that a part encounters a flow).

Figure 9:
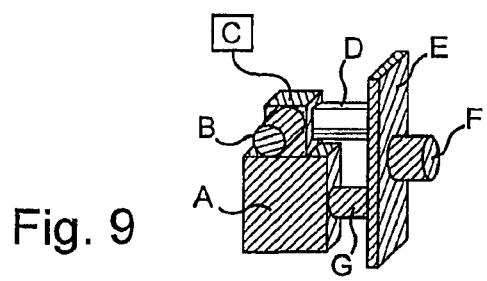
FIG. 9 is a schematic view of a third means of visualization of the propagation of the flow in the structure of FIG. 1.

FIG. 9 illustrates another means of visualization of the second pairs of parts of the assembly, as well as the path taken by the flow in this assembly.

This involves a three-dimensional representation of the structure 10 of FIG. 1, in which the different parts of the second pairs with which the selected part (for example, C) is in direct or indirect contact are identified in different manner according to the rank of contact.

One borrows, for example, the color codes of FIG. 8 that were used to identify a particular depth in the tree of propagation.

Thus, the parts A, B and C are shown in the same color, while the parts G, E and F are shown respectively with the color codes assigned to the levels 2, 3 and 4 of the tree of FIG. 8.

It will be noted that the nonconductive parts are shown in a special manner, for example, the part D is shown as a line connection.

This as well is a means of quick and efficient determination of a path taken by the electrical flow in the structure.

It will be noted that in determining such a path for the electrical flow, one is in a position to detect design errors in the structure.

In fact, assuming that the part G likewise would be nonconductive, the flow could not propagate itself in the structure as far as part F, which would allow one to notice errors, for example, in the choice of materials used for the fabrication of part D and/or G.

Figure 10:
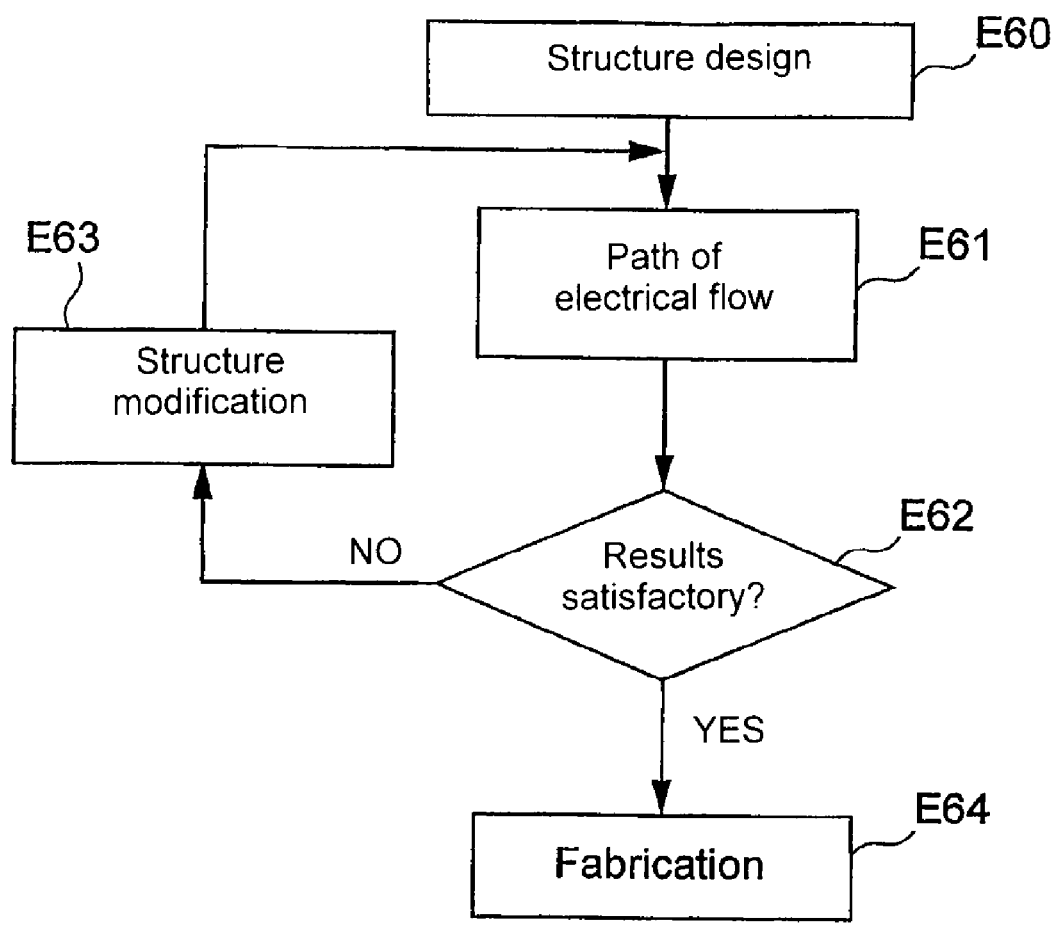
FIG. 10 is a simplified schematic view of a process of fabrication of the structure of FIG. 1 in a CAD environment in three dimensions.

The determination of the path taken by the electrical flow in an aircraft structure such as that of FIG. 1 falls within the general scheme shown in FIG. 10, which defines a CAD environment in three dimensions.

This figure describes the process of fabrication of an aircraft structure starting with step E60 for design of the structure. During this step, the various parts making up the assembly are defined and assembled.

Also in the course of this step the different files mentioned with regard to the description of FIG. 2 are created (geometrical 3D representation of the parts, geometrical positioning of the parts in space, etc.).

During the next step E61, one determines the propagation of the electrical flow in this structure, as described above, in order to detect any design errors.

The next step E62 is a test step which is performed depending on the results of the preceding step E61 and leads to the making of a decision as to how the process should continue.

Thus, depending on the results obtained in step E61, it will be decided whether to revise the design of the structure by modifying the assembly of parts when design errors are detected (step E63), or to continue with the fabrication of the structure when no design error has been detected (step E64).

It should be noted that in case of modification of the structure either because of a change in the materials used to realize the parts making up the assembly, or because of a modification of the actual geometry of the assembly or of one of the parts, one will again determine in the structure so modified the path taken by the flow in the latter, in order to make sure that the structure is free of defects.

According to one version not shown, it should be mentioned that it is possible to select more than one part of the assembly from which the flow will be propagated in the structure and, for example, two parts of the assembly can be selected for this purpose.

According to one variant embodiment, it may be of interest to locate nonconductive parts in the structure.

For this, it is enough to modify step E24 of the algorithm of FIG. 4, making this step consist solely in performing the following calculation:

$$\text{Eff}(i,j) = \text{Conduc}(i) \times \text{Con}(i,j).$$

This makes it possible to obtain, in the table or matrix 14 illustrated in FIG. 4, zero values for all the boxes of the column corresponding to the nonconductive part D, while in the row corresponding to part D one finds values of 1 in the boxes corresponding respectively to the intersection of the row of part D and the columns of parts C and E.

Figure 11:
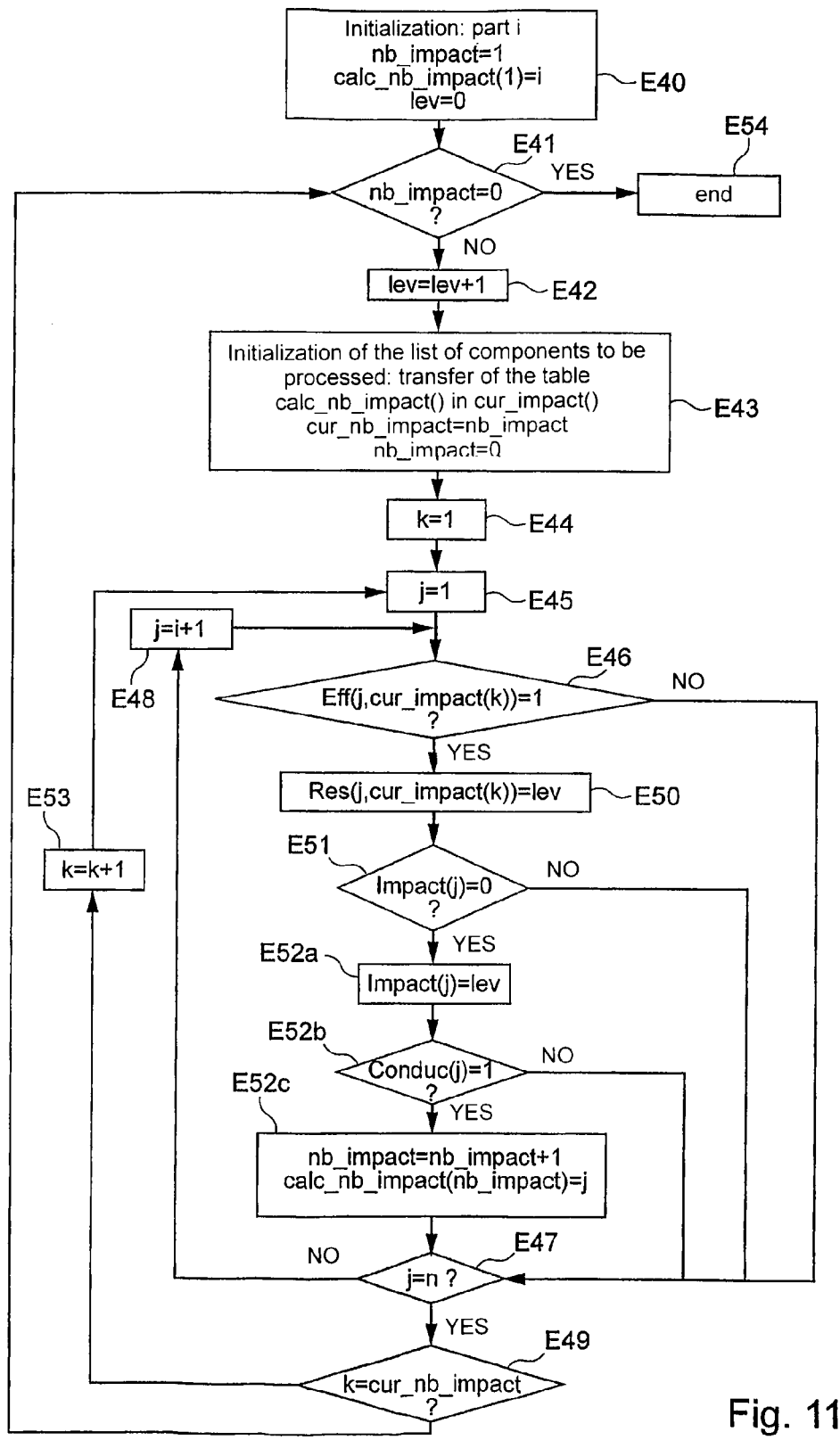
FIG. 11 is a variant of the algorithm of FIG. 6.

In order to be able to visualize nonconductive parts in the path taken by the electrical flow through the structure, the algorithm of FIG. 6 is replaced by the algorithm of FIG. 11, in which the steps E52*a*, E52*b* and E52*c* replace step E52 of FIG. 6. The content of the two steps E52*a* and E52*c* is the same as that of step E52.

However, the added step E52*b* makes it possible to determine whether the newly impacted part is conductive or not.

Thanks to this modified algorithm, one is thus able to visualize in the path taken by the electrical flow the various nonconductive parts.

This makes it possible, under certain circumstances, to quickly detect any design errors.

It will be noted that the visualization of these nonconductive parts can be done through a table or a matrix such as that of FIG. 7, a tree of propagation such as that of FIG. 8, or a three-dimensional representation of the part such as that of FIG. 9.

It will be noted that the allowance for nonconductive parts is translated by the end of a branch in the tree of propagation.

Figure 12:
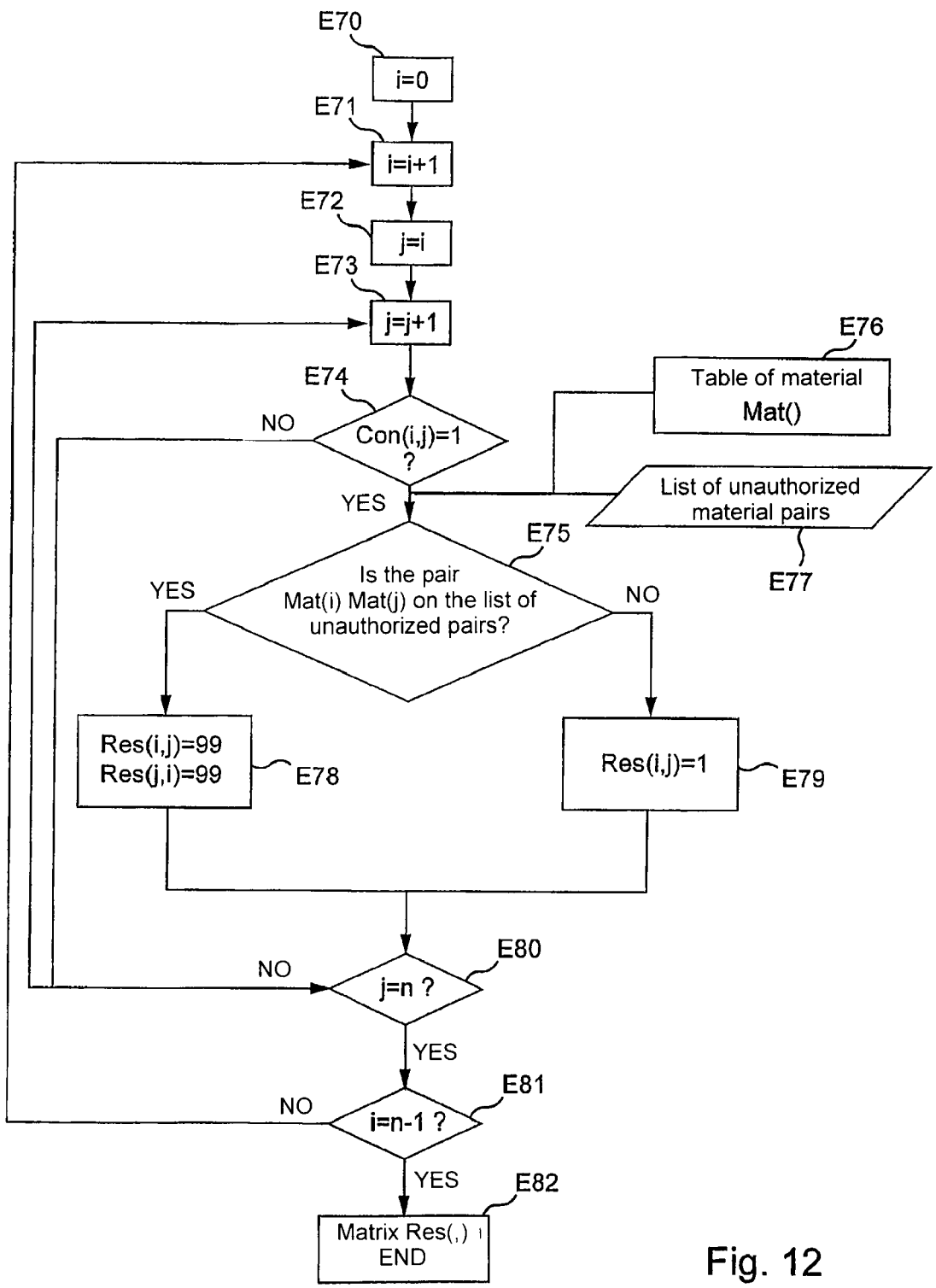
FIG. 12 is an algorithm for determination of the materials used in the structure of FIG. 1 that are incompatible with each other.

FIG. 12 illustrates an algorithm making it possible to identify in the structure the materials which are incompatible with each other for the different parts identified in the pairs of parts of the assembly.

Generally speaking, one determines, in step E74, whether the parts i and j of a pair of parts of the assembly are in contact with one another and, in step E75, whether the materials are compatible (or authorized) or not (depending on steps E76 and E77), then one assigns to the particular pair a value representative of the compatibility or the incompatibility. This value is used, for example, in one of the preceding algorithms.

The algorithm starts with a step E70 of initialization of the variable i at 0, then an incrementing of this variable by one unit in the step E71.

Steps E72 and E73 respectively call for making the values of the variables j and i equal and incrementing the value of the variable j by one unit.

It will be noted that it is enough to process half of the matrix (i, j) in this algorithm, inasmuch as it is symmetrical.

During the next step E74, a test is performed on the value of the variable Con(i,j) with respect to the value 1 (contact or absence of contact).

If this value has not been reached, one then goes to a test step E80 for the value of the variable j (have all the parts of the assembly been run through for a given part i?). If not, one returns to the aforesaid step E73 to increment the value of the variable j and, otherwise one goes on to the next step E81, which will be described below.

Upon returning to step E74, when the result of the test is positive, one then moves on to the next step E75.

This step calls for performing a test based on a table of the different materials used for the parts of the assembly (E76) and a list of pairs of materials which are incompatible with each other (E77).

The creation of a table containing the different materials used is done in step E76, while the creation of a list of pairs of nonauthorized materials is done in step E77.

The test performed in step E75 consists in determining whether the materials used to make the parts i and j are on the list of pairs of materials incompatible with each other.

If so, step E75 is followed by step E78, which calls for assigning, for example, the predefined values Res(i,j)=99 and Res(j,i)=99 belonging to an error code.

When the materials used for the pair of parts i and j are not prohibited, then step E75 is followed by step E79, which calls for setting the variable Res(i,j) at 1.

The algorithm continues with the aforesaid step E80 for testing the value of the variable j.

As already mentioned, step E80 is followed either by step E73, already described above, or by step E81.

During this latter step, a test is performed on the value of the variable i with respect to the value n−1 and, if they are equal, the algorithm is concluded with step E82.

If not, the variable i is incremented by one unit in step E71, already described above, and the algorithm continues as already indicated.

One thus uses the connectivity model previously established in FIG. 2 to look for possible incompatibilities of materials in the different pairs of the assembly.

As an example, one can determine such an incompatibility for the galvanic pairs, that is, the pairs of materials which, in the presence of one another, are the site of a corrosion phenomenon.

One such example of a galvanic pair is illustrated by the aluminum-titanium pair.

Figure 13:
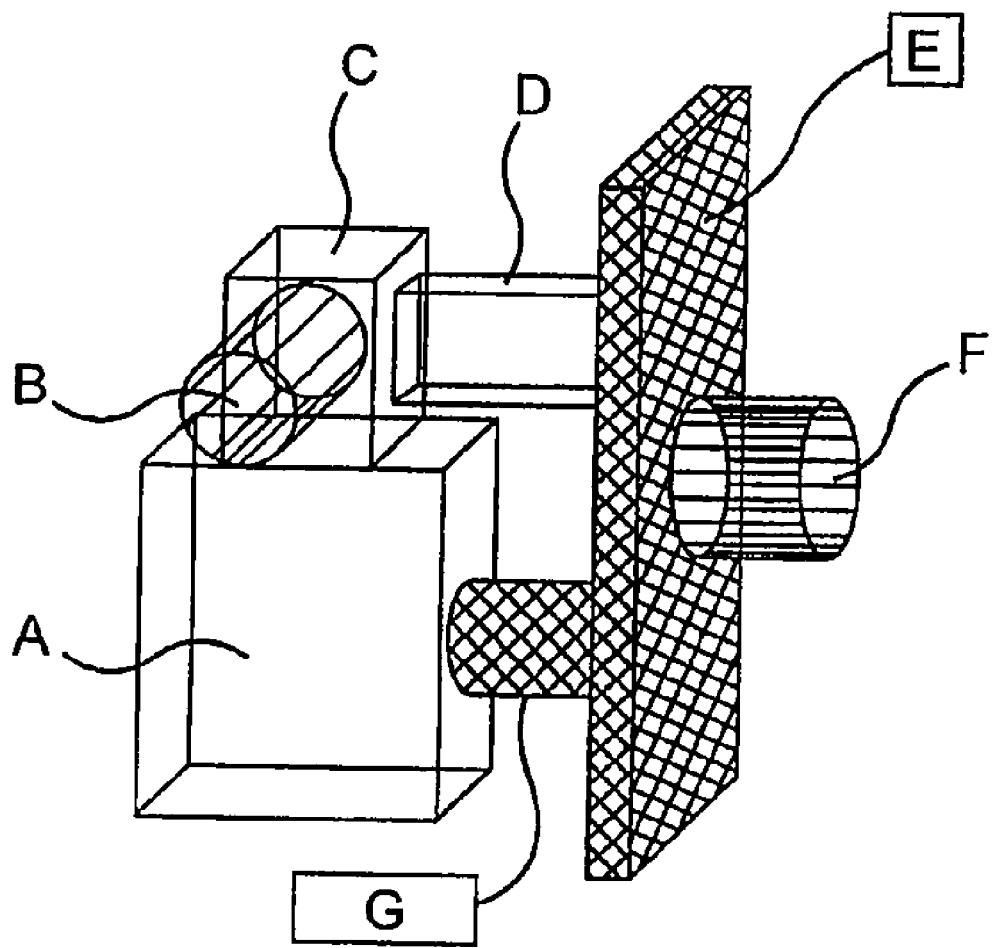
FIG. 13 is a schematic view representing a means of visualization of the parts of the structure of FIG. 10 that are incompatible with each other.

The algorithm of FIG. 12 makes it possible to obtain results which can be illustrated, for example, on a three-dimensional representation of the structure, as shown in FIG. 13.

In this figure, the visualization of the parts of the assembly that are incompatible with each other makes use of a specific color or marking.

When the parts of the assembly do not present an incompatibility with each other, they are represented, for example, by a line connection, for better visualization.

In the example realized, the pair of parts G and E corresponds to the pair of materials titanium-aluminum, which is a pair of nonauthorized materials, and it has been shown by a specific hatching.

It will be noted that, in the preceding description of FIGS. 1 to 12, when speaking of columns, this term can be replaced by the term row and vice versa, without this modifying the principle of the invention.

It will be noted, furthermore, that the results obtained by the different algorithms which have been described can be visualized by any of the means of representation of FIGS. 7, 8 and 9.

The invention is likewise very useful since it makes it possible to determine the behavior with respect to the propagation of a flow of a structure that is designed in portions at locations geographically remote from each other and whose various portions are normally joined together only at the time of fabrication. One can thus ascertain, prior to the physical joining of these portions, any problems involving discontinuities between the portions or geometry differences between the portions of the final assembly.

According to one version, not shown, a calculation of the electrical flow crossing the structure and passing through each of its parts can be done from the effective matrix illustrated in FIG. 4.

For this, one should calculate, for each of the pairs of parts in contact, the contact surface between these parts.

This surface can be obtained by means of interference calculations which can be done in a CAD type environment.

The calculation of the electrical flow at the level of each part through which the flow moves in the structure makes it possible to determine the behavior of the structure with respect to physical phenomena different from that explained above and often more complicated, such as the finding of a temperature rise in the structure at one or more parts, risks of appearance of electric arcs, etc.

Moreover, the invention also applies more generally to the determination of a path taken by a flow of a physical quantity that is propagating in a structure comprising a mechanical assembly of parts.

For example, it may involve a heat flow and one then identifies the parts of the assembly that are in mechanical contact with each other and then, from among these, the ones that make it possible to establish a thermal contact between them.

In indirect manner, one identifies the parts which are insulating and conductive of heat.

The rest of the operations are identical to what has been described above with regard to the electrical flow as involves the determination of the second pairs of parts and the determination of the path or paths taken by the flow.

It will be noted that the various aforementioned algorithms can be part of one or more computer programs which can be loaded on a data processing system, for example, a workstation or a PC. The execution of this or these programs makes it possible to implement the method of the invention.

Furthermore, the algorithm of FIG. 10 can be the entire part or partial part of a computer program. For example, only step E61 may be a part thereof.

It will be noted that the preceding description, given in reference to the attached drawings, involves more particularly the verification of the conformity of the physical behavior of a structure (assembly of parts) with respect to a criterion which is that of the propagation of a flow of a physical quantity in the structure.

However, the invention is of more general scope and involves in general the analysis of the physical behavior of an assembly of parts with respect to design criteria which may be different from the aforesaid criterion. One can thus take into account other criteria in order to determine, for example, whether a structure or a portion thereof is tight or else whether it has undergone a surface treatment that might affect its physical behavior with regard to external constraints or determine how the assembly is modified overall based on a local modification.

The application of the method to other criteria can be done simply by using the algorithms of the aforementioned figures and adapting them when necessary.

Thus, the steps of these algorithms involving particularly the propagation of a flow in the structure and the determination of a path taken by this flow are identical, only step E24 of FIG. 4 corresponding to the treatment of the efficacy of the relationship is replaced and adapted to the predetermined criterion which the structure normally needs to satisfy.

Generally speaking, the algorithms remain basically the same, only the rules for constructing the efficacy matrix of FIG. 4 change according to the design criterion being used.

It will also be noted that step E61 of the algorithm of FIG. 10 is replaced, in a more general context than that described above, by the verification/determination of the conformity of the physical behavior of a structure to one or more predetermined criteria.

The invention claimed is:

1. A method of analyzing an assembly of parts with respect to at least one predetermined design criterion, the method comprising:
    providing design data represented by digital mockups, each digital mockup faithfully representing one part in three dimensions, and assembling of the digital mockups with each other defining the assembly of parts in three dimensions;
    identifying the parts of the assembly;
    determining, among the parts of the assembly thus identified, several first pairs of parts, each of the first pairs of parts defining two parts in mechanical contact with one another;
    determining, among the first pairs of parts, several second pairs of parts, each of the second pairs of parts defining two parts which conform to said at least one predetermined criterion;
    identifying a set of the second pairs of parts;
    determining, in dependence on the identified set of second pairs of parts, a result of the analysis of the assembly of parts with respect to said at least one predetermined design criterion; and
    determining at least one path taken by a flow of a physical quantity in the assembly or a portion thereof.

2. The method according to claim 1, wherein the assembly of parts contains several subassemblies or portions, each subassembly or portion including a plurality of parts, the subassemblies being designed separately from each other.

3. The method according to claim 1, the method further comprising:
    identifying the parts of the assembly and determining the first and second pairs of parts, the determining of the second pairs of parts being done according to properties of the materials making up the parts of the first pairs of parts, and the two parts of each second pair being able to propagate the flow from one part to the other;
    selecting at least one of the parts of the assembly;
    identifying, among the parts of the second pairs of parts, the parts which are able to propagate the flow coming directly or indirectly from said at least one part selected in the form of the set of second pairs of parts; and
    determining, in dependence on the parts thus identified, at least one path taken by the flow in the assembly or a portion thereof from said at least one selected part.

4. The method according to claim 3, further comprising:
    displaying the parts of the second pairs of parts that are able to propagate the flow coming directly or indirectly from said at least one selected part.

5. The method according to claim 3, further comprising:
    determining a contact rank among the identified parts of the second pairs of parts and said at least one selected part, a part in direct contact with said at least one selected part being a part of a contact rank 1, an indirect contact being identified by a contact rank greater than 1.

6. The method according to claim 5, further comprising:
    displaying the contact rank between the identified parts of the second pairs of parts.

7. The method according to claim 5, wherein the parts of the second pairs are displayed in a table of two dimensions, having as row and column headings the different parts of the assembly, and having boxes located at the intersection of the various rows and columns, each box containing information, for the corresponding pair of parts, on the ability or lack of ability to propagate the flow between the corresponding parts of the pair and, in case of an ability to do so, each particular box containing information as to the rank of contact between the corresponding parts.

8. The method according to claim 5, wherein the parts are displayed in a propagation tree diagram having as its root said at least one selected part and as its branches the parts of the second pairs with which it is in direct or indirect contact, said parts of the second pairs being organized according to a hierarchical branching established as a function of different levels of propagation in the tree, each level corresponding to the contact rank between said at least one selected part and each of said parts of the second pairs.

9. The method according to claim 5, wherein the parts are displayed in a three-dimensional representation of the assembly, the different parts of the second pairs with which said at least one selected part is in direct or indirect contact being identified in a different manner, depending on the contact rank.

10. The method according to claim 1, wherein the physical quantity is heat.

11. The method according to claim 1, wherein the physical quantity is electrical current.

12. The method according to claim 1, wherein all of the pairs of parts in mechanical contact with one another are determined.

13. A method of fabrication of an assembly of parts, comprising:
    analyzing the assembly with respect to at least one predetermined design criterion according to claim 1; and
    determining the fabrication of the assembly or a modification of the assembly of parts prior to the fabrication depending on the result of the analysis.

* * * * *